UNITED STATES PATENT OFFICE.

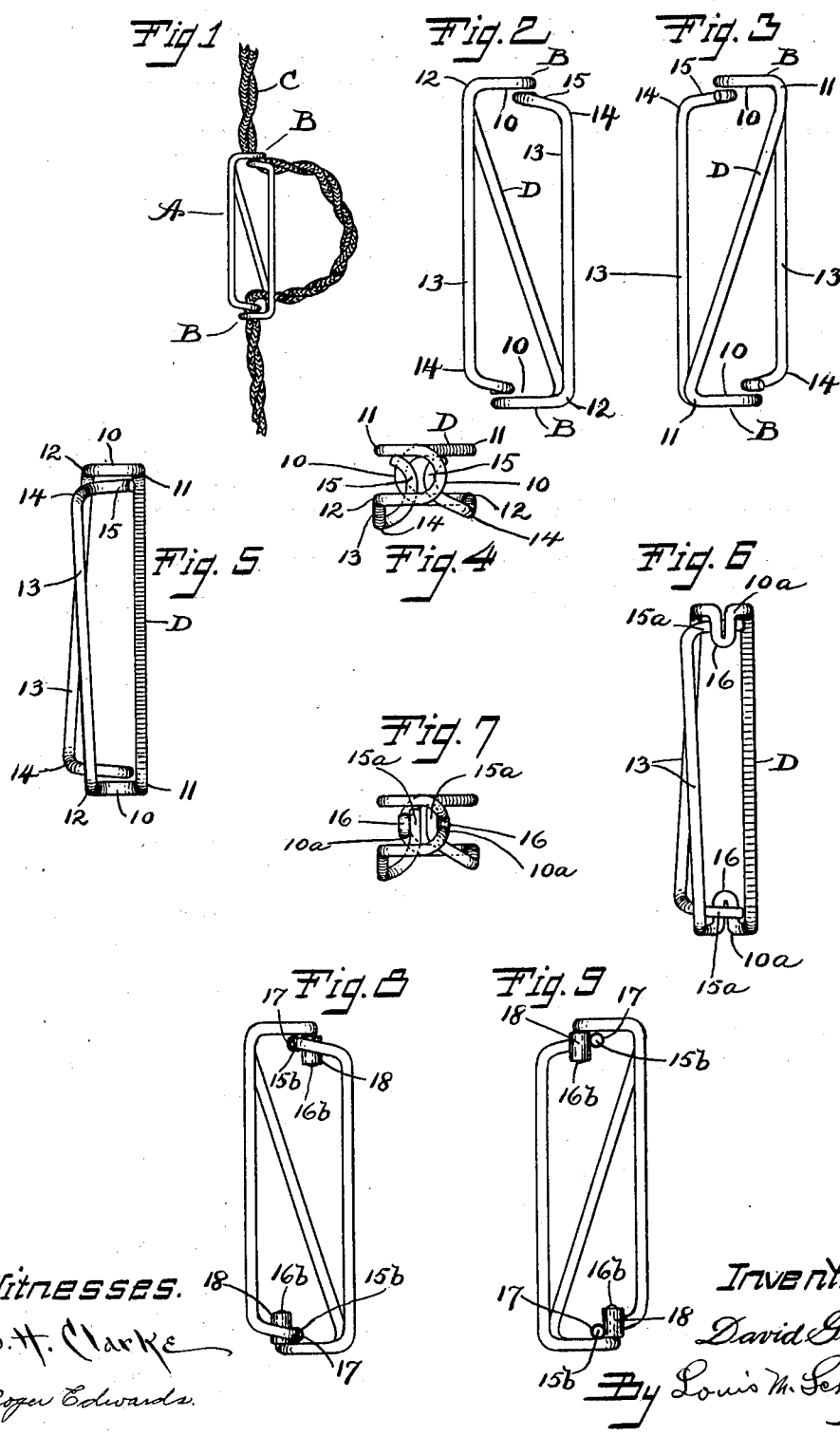

DAVID GOULD, OF PLAINVILLE, CONNECTICUT.

CORD-ADJUSTER.

1,053,593.  Specification of Letters Patent.  Patented Feb. 18, 1913.

Application filed September 11, 1912. Serial No. 719,736.

*To all whom it may concern:*

Be it known that I, DAVID GOULD, a citizen of the United States, residing at Plainville, in the county of Hartford and State of Connecticut, have invented certain new and useful Improvements in Cord-Adjusters, of which the following is a specification.

My invention relates to cord adjusters, and has particular reference to devices used for varying the effective length of cords and particularly the electric cord conductors used for connecting and supporting incandescent lamps and the object of my improvement is to produce such a device that is simple to make and to operate and that can be readily applied to and removed from a cord intermediate the length thereof and without manipulation of the ends thereof.

In the accompanying drawing:—Figure 1 is a side elevation of my cord adjuster and of a cord conductor to which the same is applied. Fig. 2 is a similar view on an enlarged scale of the same removed from the cord. Fig. 3 is a reverse view of the same. Fig. 4 is a plan view of the same. Fig. 5 is a side view of the same. Fig. 6 is a similar view of a modification of my cord adjuster. Fig. 7 is a plan view of the same. Figs. 8 and 9 are views similar to Figs. 2 and 3 of another modification of my cord adjuster, showing insulation applied to the jaws.

My cord adjuster A is formed of a single piece of spring wire and comprises a pair of clamps or clips B at each end each of which is suitable for engaging with and clamping the cord C and which clamps B are cross-connected and separated by an appreciable space by a cross-connecting member D. The clamp B comprises in each case as one clamping member a loop 10 positioned in a plane at right angles to the axis of the cord C and which is suitable for receiving the cord C, one arm of the loop 10, as shown, being connected by an acute angle bend as shown at 11 to the cross-connecting member D. As shown in Figs. 1 to 5 inclusive the upper and lower loops 10 are oppositely directed so that the cross-connecting member D is positioned diagonally as shown in Figs. 2 and 3 in passing from one loop 10 to the other. The mating or free arm of the loop 10 is connected by a right angle bend as shown at 12 to one end of a longitudinally extending arm 13 which is connected at the other end by an approximately right angle bend 14 with a laterally directed branch arm 15 that is positioned adjacent the loop 10 and suitable for coöperating therewith as a clamping member. The branch arm 15 may be slightly concave or looped, as shown in Fig. 4 or the same may be straight as in the case of the arm 15ª as shown in Fig. 7. The elements described are so set and positioned that the arms 13 tend to open outward as shown in Fig. 2, so that when the cord C is interposed between the branch arm 15 and loop 10, these serve as coöperating jaws and tend to clamp the said cord and resiliently hold the same. Pressure applied to the arm 13 operates to release the clamping pressure and to permit sliding the cord C to a new position.

In order to permit the removal or entry of the cord C to the clamp B the pressure on the arm 13 to relieve the clamping pressure is accompanied by a sidewise movement thereof, moving the branch arm 15 laterally and away from its clamping position, thereby leaving the loop 10 free and open for effecting such removal or entry. The straight form of branch arm 15ª shown in Fig. 7 facilitates the movement described.

In the modification shown in Fig. 6 the apex of the loop 10ª is extended longitudinally in the form of a return bend 16, extending across the path of the clamping arm 15ª and which serves as a clamping member proper and permits of a direct clamping effect in coöperating with the branch arm 15ª.

It is apparent that some changes from the specific construction herein disclosed may be made and therefore I do not wish to be understood as limiting myself to the precise form of construction shown and described, but desire the liberty to make such changes, in working my invention, as may fairly come within the spirit and scope of the same as claimed.

In the modification shown in Figs. 8 and 9 an insulating sleeve 17 is applied to the jaw 15ᵇ and an insulating block 18 is applied to the return bend 16ᵇ. In this case the details as to dimensions are arranged to accommodate the said insulating sleeve 17 and insulating block 18. Otherwise the construction and operation are similar to those already described.

I claim as my invention:

1. A cord adjuster formed of a single piece of wire and comprising a pair of clamps comprising each a loop serving as one jaw and a branch arm serving as the coöperating jaw, a connecting member cross-connecting the said loops by connecting with one arm of each loop, and two arms each connecting the free arm of one of the said loops with one of the said branch arms.

2. A cord adjuster formed of a single piece of wire and comprising a cross-connecting member at the middle portion, a loop at each end of the said cross-connecting member, an arm connected to each of the said loops, a branch arm connected to each of the said arms, and in each case as determined by the longitudinal extent of the adjuster the branch arm on one side of the said cross-connecting member and the loop at the other side thereof being coöperative as clamping members.

3. A cord adjuster having a pair of clamps comprising each a pair of coöperating jaws, a cross-connecting member connecting a jaw of one clamp with a jaw of the other clamp, and two arms each connecting the remaining jaw of one clamp with the first mentioned jaw of the other clamp.

4. A cord adjuster having a pair of clamps comprising each a pair of jaws, one jaw of each clamp being suitably spaced from one jaw of the other clamp by a cross-connecting member, supporting arms each extending from the said one jaw in each of the said clamps and the others of the said jaws supported from the said arms.

5. A cord adjuster formed of a piece of wire and comprising a pair of spring clamps having each a pair of coöperating jaws, and a cross-connecting member connected to one jaw of each of the said clamps and serving to interconnect and to space the said jaws, supporting arms one extending from the said one jaw of each clamp respectively and serving as the support for the other jaw of the other clamp, and an insulating body mounted on one of the said jaws.

DAVID GOULD.

Witnesses:
SHEFFIELD H. CLARKE,
ROGER W. EDWARDS.

---

Copies of this patent may be obtained for five cents each, by addressing the "Commissioner of Patents, Washington, D. C."